(12) United States Patent
Yamashita et al.

(10) Patent No.: US 12,375,781 B2
(45) Date of Patent: Jul. 29, 2025

(54) INFORMATION PROCESSING APPARATUS, IMAGING SYSTEM, AND INFORMATION PROCESSING METHOD

(71) Applicant: SONY SEMICONDUCTOR SOLUTIONS CORPORATION, Kanagawa (JP)

(72) Inventors: Hiroki Yamashita, Kanagawa (JP); Muhammad Siddiqui, Stuttgart (DE); Yalcin Incesu, Stuttgart (DE); Tomoki Ueda, Kanagawa (JP); Masaru Suzuki, Kanagawa (JP); Masahiro Ito, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 38 days.

(21) Appl. No.: 18/262,435

(22) PCT Filed: Jan. 7, 2022

(86) PCT No.: PCT/JP2022/000379
§ 371 (c)(1),
(2) Date: Jul. 21, 2023

(87) PCT Pub. No.: WO2022/163327
PCT Pub. Date: Aug. 4, 2022

(65) Prior Publication Data
US 2024/0080536 A1     Mar. 7, 2024

(30) Foreign Application Priority Data

Jan. 29, 2021  (JP) ................... 2021-013782

(51) Int. Cl.
*H04N 23/13*  (2023.01)
*G06T 7/90*   (2017.01)
*H04N 23/10*  (2023.01)

(52) U.S. Cl.
CPC .............. *H04N 23/13* (2023.01); *G06T 7/90* (2017.01); *H04N 23/10* (2023.01); *G06T 2207/10024* (2013.01)

(58) Field of Classification Search
CPC .. H04N 23/13; G06T 7/90; G06T 2207/10024
See application file for complete search history.

(56) References Cited

U.S. PATENT DOCUMENTS 7,417,746 B2     8/2008  Lin et al.

FOREIGN PATENT DOCUMENTS

JP     09-172649 A      6/1997
JP     2004-320568 A   11/2004
(Continued)

OTHER PUBLICATIONS

International Search Report and Written Opinion of PCT Application No. PCT/JP2022/000379, issued on Mar. 15, 2022, 10 pages of ISRWO.

(Continued)

*Primary Examiner* — Girumsew Wendmagegn
(74) *Attorney, Agent, or Firm* — CHIP LAW GROUP

(57) ABSTRACT

Provided is an information processing apparatus including a first acquisition unit, a second acquisition unit, and an estimation unit. The first acquisition unit acquires first sensing information obtained by capturing an image of a subject using a first sensor including a single-plate image sensor. The second acquisition unit acquires second sensing information obtained by sensing a direction different from a direction of the first sensor using second sensor. The estimation unit estimates the spectral reflectance of the subject (Continued)

based on the first sensing information and the second sensing information.

16 Claims, 8 Drawing Sheets

(56) References Cited

FOREIGN PATENT DOCUMENTS

| | | | |
|---|---|---|---|
| JP | 2006-287585 A | 10/2006 | |
| JP | 2010197735 * | 9/2010 | ............... G09G 3/20 |
| JP | 2020-005053 A | 1/2020 | |
| JP | 2020-024103 A | 2/2020 | |
| JP | 2020-027033 A | 2/2020 | |
| WO | WO-2005071372 A1 * | 8/2005 | ........... A61B 5/0013 |
| WO | 2016/208415 A1 | 12/2016 | |

OTHER PUBLICATIONS

Yokogawa, et al., "Plasmonic Color Filters for CMOS Image Sensor Applications", Nano Letters 12(8), Jul. 16, 2012, American Chemical Society, 06 pages.

* cited by examiner

INFORMATION PROCESSING APPARATUS, IMAGING SYSTEM, AND INFORMATION PROCESSING METHOD

CROSS REFERENCE TO RELATED APPLICATIONS

This application is a U.S. National Phase of International Patent Application No. PCT/JP2022/000379 filed on Jan. 7, 2022, which claims priority benefit of Japanese Patent Application No. JP 2021-013782 filed in the Japan Patent Office on Jan. 29, 2021. Each of the above-referenced applications is hereby incorporated herein by reference in its entirety.

FIELD

The present disclosure relates to an information processing apparatus, an imaging system, an information processing method, and a program.

BACKGROUND

A spectral sensing technique using an image sensor using a complementary metal oxide semiconductor (CMOS) or the like as a spectroscope has been proposed. As a method of using an image sensor as a spectroscope, for example, a method of using a Fabry-Perot filter or a Plasmonic filter is known (for example, refer to Patent Literature 1 and Non Patent Literature 1).

In the case of using such a filter, a variation in spectral sensitivity of the image sensor becomes larger than in the case of using conventional filters of three colors of red, blue, and green. Therefore, a calibration technique for an image sensor configured to estimate spectral sensitivity has been proposed (for example, refer to Patent Literature 2).

CITATION LIST

Patent Literature

Patent Literature 1: U.S. Pat. No. 7,417,746
Patent Literature 2: JP 2020-5053 A

Non Patent Literature

Non Patent Literature 1: S. Yokogawa, S. P. Burgos, and H. A. Atwater, "Plasmonic color filters for CMOS image sensor applications", Nano Letters, 12(8), 4349-4354, 2012.

SUMMARY

Technical Problem

The spectral sensing described above is significantly affected by ambient light. For example, in the outdoors, the results of spectral sensing may significantly change between daytime and evening. Therefore, a spectral sensing technique that is not affected by ambient light is required.

Therefore, the present disclosure provides a mechanism capable of further reducing the influence of ambient light in the spectral sensing technique.

It is noted that the above problem or object is merely one of a plurality of problems or objects that can be solved or achieved by a plurality of embodiments disclosed in the present specification.

Solution to Problem

According to the present disclosure, an information processing apparatus is provided. The information processing apparatus includes a first acquisition unit, a second acquisition unit, and an estimation unit). The first acquisition unit acquires first sensing information obtained by capturing an image of a subject using a first sensor including a single-plate image sensor. The second acquisition unit acquires second sensing information obtained by sensing a direction different from a direction of the first sensor using second sensor. The estimation unit estimates the spectral reflectance of the subject based on the first sensing information and the second sensing information.

DESCRIPTION OF EMBODIMENTS

Figure 1:
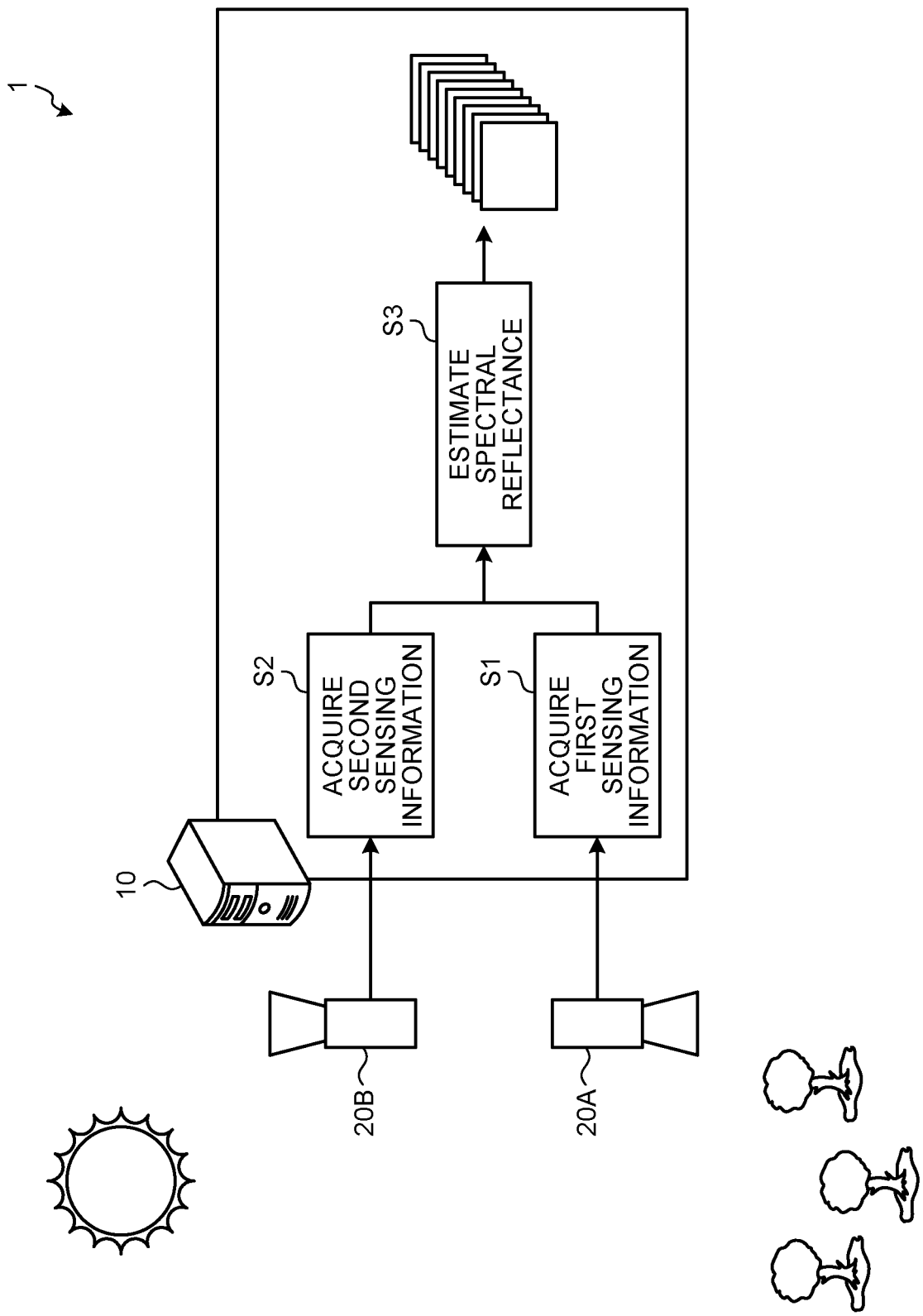
FIG. 1 is a diagram illustrating an outline of information processing according to a technique of the present disclosure.

Hereinafter, embodiments of the present disclosure will be described in detail with reference to the accompanying drawings. It is noted that, in the present specification and the drawings, components having substantially the same functional configuration are denoted by the same reference numerals, and redundant description is omitted.

In addition, in the present specification and the drawings, similar components of the embodiments may be distinguished by attaching different alphabets after the same reference numerals. However, in a case where it is not necessary to particularly distinguish each of similar components, only the same reference numeral is assigned.

One or more embodiments (including embodiments and modifications) described below can each be implemented independently. On the other hand, at least some of the plurality of embodiments described below may be appropriately combined with at least some of other embodiments. The plurality of embodiments may include novel features different from each other. Therefore, the plurality of embodiments can contribute to solving different objects or problems, and can exhibit different effects.

It is noted that the description will be given in the following order.
1. Introduction
1.1. Background
1.2. Proposed technique
2. First embodiment
2.1. Imaging system
2.1.1. First sensor
2.1.2. Second sensor
2.1.3. Information processing apparatus
2.2. Estimation processing
3. Second embodiment
4. Third embodiment
5. Fourth embodiment
6. Fifth embodiment
7. Sixth embodiment
8. Hardware configuration
9. Summary 1. Introduction 1.1. Background A general camera using an image sensor acquires information of three colors of red (R), blue (B), and green (G) and reconstructs a color image. On the other hand, a camera that implements spectral sensing, that is, a spectroscope using an image sensor acquires information of more wavelengths and reconstructs a spectral image. A spectral sensing technique is expected to be applied to, for example, biometric authentication, healthcare, agricultural sensing, and the like.

In the spectral sensing, there is a possibility that performance significantly changes due to a change in ambient light. This is because, in the conventional spectral sensing, information to be acquired is changed not only by a subject but also by ambient light.

As a technique of reducing the influence of ambient light, for example, JP 2002-204364 A discloses a technique of reducing the influence of ambient light by performing learning in advance and performing color conversion signal processing on an input image. In addition, JP 2006-287585 A discloses a technique of estimating a spectral reflectance of a subject by generating a lookup table in advance and performing image conversion on an input image based on the lookup table to reduce an influence of ambient light.

However, in order to improve accuracy of spectral sensing, it is desirable to further reduce the influence of ambient light.

Therefore, a proposed technique of the present disclosure provides a mechanism capable of further reducing the influence of ambient light in a spectral sensing technique.

1.2. Proposed Technique

FIG. 1 is a diagram illustrating an outline of information processing according to the technique of the present disclosure. Information processing according to the technique of the present disclosure is executed by an imaging system 1. The imaging system 1 includes an information processing apparatus 10, a first sensor 20A, and a second sensor 20B.

The first sensor 20A is a sensor (imaging apparatus) including a single-plate image sensor (not illustrated). The first sensor 20A captures an image of a subject and generates first sensing information (captured image). The first sensor 20A sets a direction in which the subject exists (subject side) as a detection direction (imaging direction).

The second sensor 20B is a sensor, a detection direction of which is different from the detection direction of the first sensor 20A, and the same generates second sensing information obtained by sensing information on ambient light. For example, it is assumed that the second sensor 20B is a single-plate image sensor, and is a sensor configured to capture an image of a light source side where the subject does not exist. In this case, the second sensor 20B generates a captured image on the light source side as the second sensing information.

The information processing apparatus 10 is an apparatus configured to control the first sensor 20A and the second sensor 20B and generate a spectral image of a subject. The spectral image is an image showing the ratio of components (spectral distribution) for each wavelength of light, and the same is generated for each wavelength.

The information processing apparatus 10 first acquires the first sensing information from the first sensor 20A (Step S1), and acquires the second sensing information from the second sensor 20B (Step S2).

The information processing apparatus 10 estimates, based on the first sensing information and the second sensing information, the spectral reflectance indicating the ratio of the components for each wavelength of reflected light of the subject (Step S3). For example, the information processing apparatus 10 removes the influence of the ambient light included in the second sensing information from the first sensing information, and estimates the spectral reflectance of the subject.

The information processing apparatus 10 outputs the estimated spectral reflectance to, for example, a display unit (not illustrated) as a spectral image for each wavelength.

As described above, the imaging system 1 according to the proposed technique of the present disclosure estimates the spectral reflectance of the subject based on the first sensing information obtained by allowing the first sensor 20A to capture an image of the subject and the second sensing information obtained by allowing the second sensor 20B to capture an image of the light source side.

The second sensing information is information obtained by sensing (capturing the image of) the light source side where no subject exists. Therefore, the information processing apparatus 10 estimates the spectral reflectance of the subject using the second sensing information, thereby making it possible to estimate the spectral reflectance of the subject in which the influence of ambient light is further reduced.

2. First Embodiment 2.1. Imaging System

Figure 2:
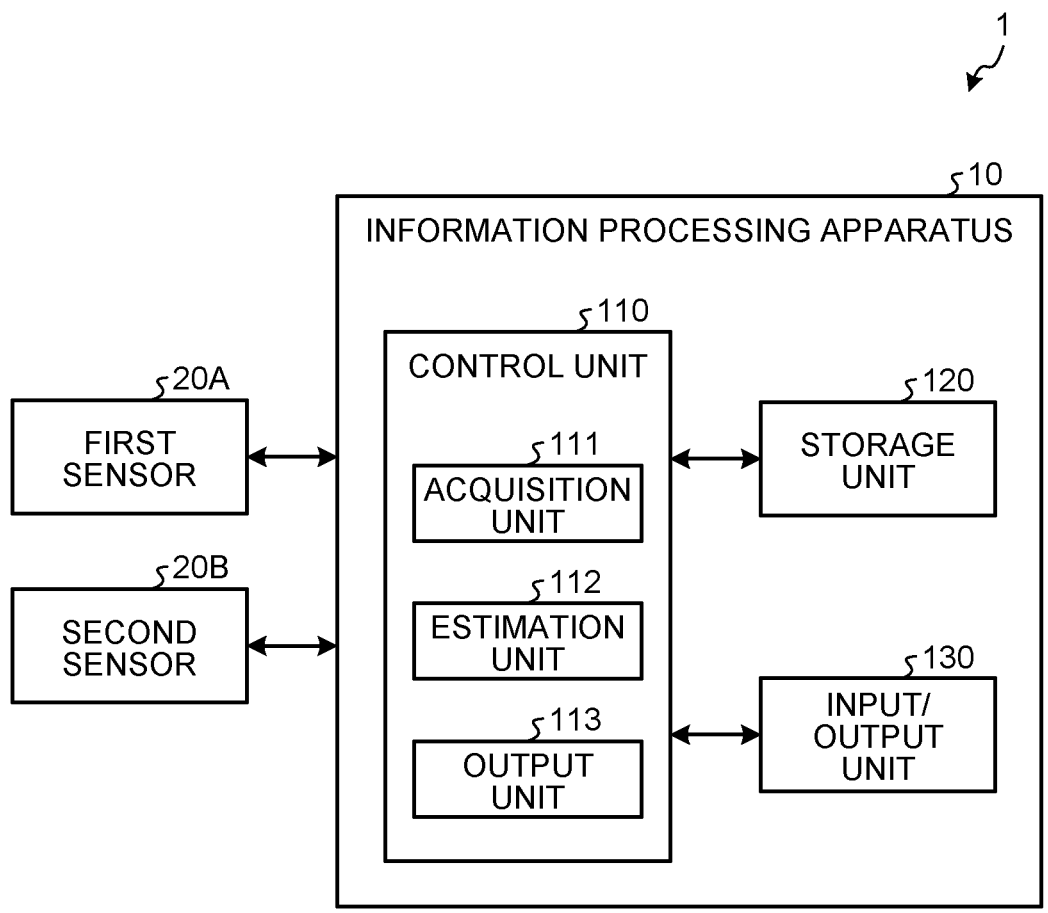
FIG. 2 is a block diagram illustrating a configuration example of an imaging system according to a first embodiment of the present disclosure.

FIG. 2 is a block diagram illustrating a configuration example of the imaging system 1 according to the first embodiment of the present disclosure. The imaging system 1 illustrated in FIG. 2 includes the information processing apparatus 10, the first sensor 20A, and the second sensor 20B.

2.1.1. First Sensor

Figure 3:
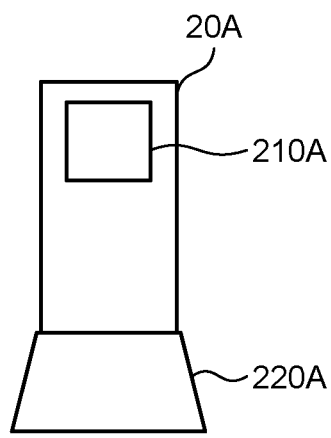
FIG. 3 is a diagram illustrating an example of a first sensor according to the first embodiment of the present disclosure.

FIG. 3 is a diagram illustrating an example of the first sensor 20A according to the first embodiment of the present disclosure. The first sensor 20A includes a single-plate image sensor 210A that captures an image of a subject, and a lens 220A.

The lens 220A is a lens having an angle of view corresponding to a subject. The image sensor 210A includes a spectroscope (not illustrated) having a plurality of optical filters configured to transmit light in a predetermined wavelength band, and a sensing element (not illustrated) in which a plurality of pixels are arranged in a matrix on the sensor surface, and the same has a spectral sensing function. That is, the first sensor 20A is a single-plate multispectral sensor.

The image sensor 210A uses a spectroscope to spectrally disperse light (reflected light) from a subject, the light being incident through the lens 220A, and detects the light emitted to the sensor surface by the sensing element, thereby outputting a measurement signal (first sensing information) corresponding to brightness of each spectral component.

It is noted that the wavelength band dispersed by the image sensor 210A is not limited to visible light, and may include a wavelength band other than visible light, such as infrared light.

2.1.2. Second Sensor

As described above, the second sensor 20B is a sensor configured to acquire information on ambient light. The second sensor 20B is disposed in the direction different from the imaging direction of the first sensor 20A. For example, the second sensor 20B is disposed in the direction opposite the imaging direction of the first sensor 20A.

Alternatively, the second sensor 20B is disposed, for example, facing the light source side. For example, when the first sensor 20A sets the direction in which a subject exists as the imaging direction, the second sensor 20B is disposed facing the direction in which the subject does not exist.

The second sensor 20B acquires, for example, information on a wavelength having a bandwidth substantially the same as the wavelength bandwidth that can be acquired by the first sensor 20A. For example, when the first sensor 20A acquires information on a wavelength other than the visible light (for example, infrared light), it is desirable that the second sensor 20B also acquires information on a wavelength other than visible light (for example, infrared light).

Figure 4:
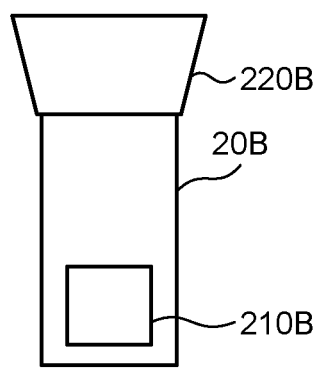
FIG. 4 is a diagram illustrating an example of a second sensor according to the first embodiment of the present disclosure.

FIG. 4 is a diagram illustrating an example of the second sensor 20B according to the first embodiment of the present disclosure. The second sensor 20B illustrated in FIG. 4 includes a single-plate image sensor 210B and a lens 220B.

The image sensor 210B includes a spectroscope (not illustrated) having a plurality of optical filters configured to transmit light in a predetermined wavelength band, and a sensing element (not illustrated) in which a plurality of pixels are arranged in a matrix on the sensor surface, and the same has a spectral sensing function. That is, the second sensor 20B illustrated in FIG. 4 is a single-plate multispectral sensor.

It is noted that the spectral sensing function of the image sensor 210B may be the same as or different from that of the image sensor 210A of the first sensor 20A. For example, the spectral numbers of the image sensors 210A and 210B may be the same or different. Alternatively, the number of pixels of the image sensors 210A and 210B may be the same or different. However, it is desirable that the ranges (wavelength bands) of the spectral sensing of the image sensors 210A and 210B are the same.

The image sensor 210B uses the spectroscope to spectrally disperse ambient light that is incident through the lens 220B, and the sensing element detects the light emitted to the sensor surface, thereby outputting a measurement signal (second sensing information) corresponding to brightness of each spectral component.

The information processing apparatus 10 identifies the incident direction of light, for example, in consideration of characteristics of the lens 220B based on the second sensing information. More specifically, for example, the information processing apparatus 10 identifies the incident direction of light, in other words, the position of the light source according to the pixel position and the pixel value of the image sensor 210B.

The lens 220B condenses light at a predetermined angle of view. The lens 220B may be a lens configured to condense light at a wider angle of view than a normal lens, such as a fisheye lens. By using the fisheye lens, ambient light at a wider range is incident on the second sensor 20B. As a result, for example, when the second sensor 20B performs sensing outdoors, the second sensor 20B can acquire both information on light in which Rayleigh scattering occurs when sunlight (light source) hits the atmosphere and information on light in which Mie scattering occurs when sunlight hits clouds.

Figure 5:
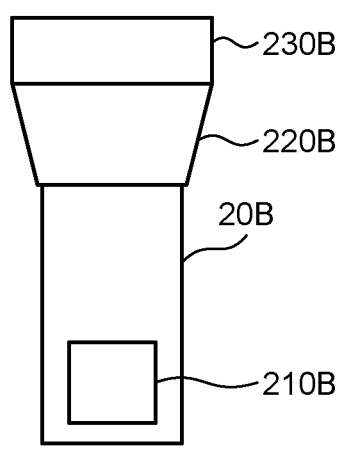
FIG. 5 is a diagram illustrating another example of the second sensor according to the first embodiment of the present disclosure.

FIG. 5 is a diagram illustrating another example of the second sensor 20B according to the first embodiment of the present disclosure. As illustrated in FIG. 5, the second sensor 20B includes a diffuser 230B in addition to the single-plate image sensor 210B and the lens 220B.

As illustrated in FIG. 5, the second sensor 20B includes the diffuser 230B, so that light can be diffused by the diffuser 230B, and the second sensor 20B can receive light incident from a plurality of directions by the image sensor 210B. As a result, the ambient light can be estimated more accurately in the signal processing in the subsequent stage.

Figure 6:
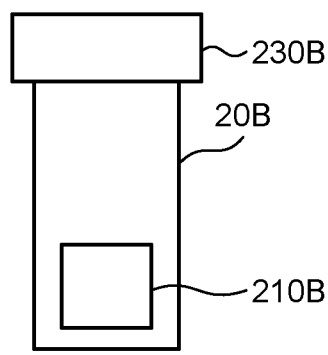
FIG. 6 is a diagram illustrating another example of the second sensor according to the first embodiment of the present disclosure.

FIG. 6 is a diagram illustrating another example of the second sensor 20B according to the first embodiment of the present disclosure. The second sensor 20B in FIG. 6 is different from the second sensor 20B illustrated in FIG. 5 in that the second sensor 20B includes the single-plate image sensor 210B and the diffuser 230B and does not include the lens 220B.

For example, by appropriately scattering light by the diffuser 230B, the second sensor 20B can appropriately acquire the second sensing information even if the lens 220B is omitted. By omitting the lens 220B, the manufacturing cost of the second sensor 20B can be further reduced.

FIGS. 5 and 6 illustrate the case in which the diffuser 230B is a flat plate, but the shape of the diffuser 230B is not limited to the flat plate and may be, for example, a hemispherical type.

Although the second sensor 20B described above is the same multispectral sensor as the first sensor 20A, the present disclosure is not limited thereto. The second sensor 20B may be a sensor different from the first sensor 20A.

For example, the second sensor 20B may be a spectroscope. In this case, the spectroscope does not necessarily have to be two-dimensional. For example, the second sensor 20B may be a sensor configured to acquire one-dimensional spatial direction and wavelength information with a two-dimensional image sensor.

Alternatively, the second sensor 20B may be a sensor configured to acquire color temperature. In this case, the second sensor 20B detects information on the color of light as color temperature information (second sensing information). The information processing apparatus 10 stores in advance a correspondence relationship between color temperature information and a spectral waveform as, for example, a table, and the same estimates a spectrum of a light source from the color temperature information in signal processing in the subsequent stage.

As described above, the second sensor 20B is not limited to a multispectral sensor, and various sensors can be applied as long as the sensors acquire information (second sensing information) for the information processing apparatus 10 to perform light source spectrum estimation in signal processing in the subsequent stage.

Furthermore, the first sensor 20A and the second sensor 20B may sense a subject and ambient light in a fixed state, or the same may be mounted on a moving body such as a drone, and may sense the subject and the ambient light while moving.

2.1.3. Information Processing Apparatus

The description returns to FIG. 2. The information processing apparatus 10 is an apparatus configured to generate a spectral image of a subject based on a sensing result from the first sensor 20A and the second sensor 20B. The information processing apparatus 10 estimates the spectral reflectance of the subject, and generates a spectral image showing a spectral distribution at each wavelength based on the estimation result.

The information processing apparatus 10 illustrated in FIG. 2 includes a control unit 110, a storage unit 120, and an input/output unit 130.

For example, the information processing apparatus 10 estimates a spectral reflectance of a subject according to an operation from a user received via the input/output unit 130, and the same presents the spectral image generated based on the estimation result to the user via the input/output unit 130.

[Control Unit 110]

The control unit 110 has a function of controlling the operation of the information processing apparatus 10. For example, the control unit 110 performs processing of estimating the spectral reflectance of the subject based on the first sensing information acquired from the first sensor 20A and the second sensing information acquired from the second sensor 20B.

In order to realize the above-described functions, the control unit 110 includes an acquisition unit 111, an estimation unit 112, and an output unit 113, as illustrated in FIG. 2. The control unit 110 may be configured by a processor such as a CPU, and may read software (computer program) that implements each function of the acquisition unit 111, the estimation unit 112, and the output unit 113 from the storage unit 120, thereby performing processing. Furthermore, one or more of the acquisition unit 111, the estimation unit 112, and the output unit 113 may be configured by a hardware circuit (processor or the like) different from the control unit 110, and may be configured to be controlled by a computer program operating on another hardware circuit or the control unit 110.

(Acquisition Unit 111)

The acquisition unit 111 functions as a first acquisition unit configured to acquire the first sensing information from the first sensor 20A. In addition, the acquisition unit 111 functions as a second acquisition unit configured to acquire the second sensing information from the second sensor 20B. The acquisition unit 111 outputs the acquired first sensing information and second sensing information to the estimation unit 112.

(Estimation Unit 112)

The estimation unit 112 estimates the spectral reflectance of the subject based on the first sensing information and the second sensing information. The estimation unit 112 estimates, by using the information on the ambient light included in the second sensing information, the spectral reflectance by reducing the influence of the ambient light from the information on the reflected light and ambient light of the subject included in the first sensing information. As a result, the estimation unit 112 can further improve the estimation accuracy of the spectral reflectance of the subject.

(Output Unit 113)

The output unit 113 generates a spectral image for each predetermined wavelength using the estimation result by the estimation unit 112, and presents the generated spectral image to a user via the input/output unit 130. It is noted that the data output by the output unit 113 is not limited to the spectral image. For example, the output unit 113 may generate and output data other than the spectral image, such as a graph indicating spectral reflectance characteristics of the subject or a result of recognizing the subject based on the spectral reflectance characteristics.

[Storage Unit 120]

The storage unit 120 the storage unit 120 is implemented by, for example, a semiconductor memory element such as a random access memory (RAM) or a flash memory, or a storage device such as a hard disk or an optical disk. The storage unit 120 has a function of storing a computer program and data (including a form of a program) related to processing in the information processing apparatus 10.

[Input/Output Unit 130]

The input/output unit 130 presents various types of output information to a user. Furthermore, the input/output unit 130 receives an input from the user. The information processing apparatus 10 performs various types of information processing in response to the input from the user received via the input/output unit 130. The input/output unit 130 includes, for example, a display, a keyboard, a mouse, and the like.

2.2. Estimation Processing

Figure 7:
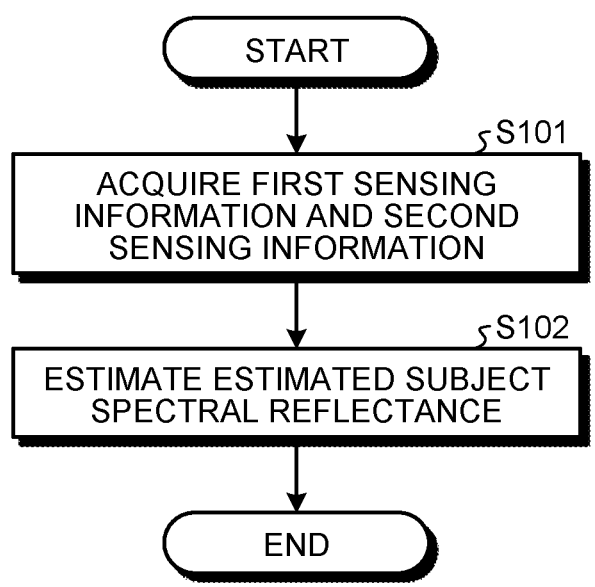
FIG. 7 is a flowchart illustrating a flow of spectral reflectance estimation processing according to the first embodiment of the present disclosure.

Next, spectral reflectance estimation processing according to the first embodiment of the present disclosure will be described with reference to FIG. 7. FIG. 7 is a flowchart illustrating a flow of the spectral reflectance estimation processing according to the first embodiment of the present disclosure. The estimation processing illustrated in FIG. 7 is executed by the information processing apparatus 10, for example, in response to an instruction of a user.

As illustrated in FIG. 7, the information processing apparatus 10 acquires the first sensing information obtained by allowing the first sensor 20A to capture an image of the subject and the second sensing information which is a sensing result by the second sensor 20B (Step S101). As described above, the first sensing information includes information on the subject and ambient light, and the second sensing information includes information on the ambient light. It is noted that the first sensing information and the second sensing information may be acquired at the same timing or may be acquired at different timings.

Next, the information processing apparatus 10 estimates a spectral reflectance of the subject using the first sensing information and the second sensing information (Step S102).

As described above, the information processing apparatus 10 estimates the spectral reflectance of the subject based on the first sensing information and the second sensing information. As described above, the second sensing information includes the information on ambient light. Therefore, the information processing apparatus 10 can estimate, by using the second sensing information, the spectral reflectance of the subject by further reducing the influence of the ambient light from the first sensing information.

3. Second Embodiment

Next, a specific method for estimating a spectral reflectance of a subject will be described as a second embodiment. It is noted that, in the following descriptions, it is assumed that a second sensor 20B is described a multispectral sensor similar to a first sensor 20A.

First, an observation model of an image sensor is generally represented as shown in Equation (1).

$$b = Ax + n \tag{1}$$

It is noted that b is an observed pixel value, A is spectral sensitivity of the image sensor, x is a subject spectrum, and n is noise.

In the model of Equation (1), when the subject spectrum is estimated, the number of subject spectra to be obtained may be less than the number of colors of the image sensor. In that case, estimating the subject spectrum becomes an ill-posed problem. As an example of a method of solving the ill-posed problem, there is a method of solving an inverse problem using Tikhonov regularization. When this method is used, the subject spectrum is represented as in Equation (2).

$$\tilde{x} = \mathrm{argmin}_x \{ \|Ax - b\|_2^2 + \lambda F(x) \} \tag{2}$$

Here, F(x) is a regularization term, and λ is a parameter. The subject spectrum is estimated using the regularization term F(x). For example, the regularization term F(x) is represented by Equation (3).

$$F(x) = \|Lx\|_2^2 \tag{3}$$

It is noted that L is a differential matrix. Furthermore, as the regularization term F(x), for example, $l_1$ norm or $l_p$ norm may be used.

For example, in the case of estimating the spectrum of a subject captured by the image sensor, an information processing apparatus 10 estimates spectral sensitivity A of the image sensor for each sensor or for each predetermined area (local area) in the light receiving surface of the sensor using a calibration technique. The information processing apparatus 10 performs signal processing using the estimated spectral sensitivity A, thereby making it possible to perform spectral estimation processing in which correction is performed for each solid state of a single-plate multispectral sensor having an image sensor mounted thereon or for each local area.

Note that, for example, there is a case where the representative value of the spectrum estimated in the actual use case is known such as a case where a representative value (sample value) of the spectrum of the human skin is known in a case where the subject is a person. In this case, the information processing apparatus 10 can use the representative value as an expected value.

In a case where the representative value is used as the expected value, the information processing apparatus 10 can improve the estimation accuracy of subject spectrum by putting the representative value, which is the look-ahead knowledge, into a normalization term. For example, the information processing apparatus 10 can improve the estimation accuracy of the spectrum using the expected value by using the regularization term shown in Equation (4). It is noted that $x_0$ is the expected value. For example, a solution is stabilized by preventing a difference from the expected value from becoming large.

$$F(x) = \|x - x_0\|_2^2 \tag{4}$$

As described above, the imaging system 1 of the present disclosure includes two multispectral sensors, the first sensor 20A and the second sensor 20B. Therefore, the observation model of each sensor is represented by Equations (5) and (6).

$$b^l = A^l x^l + n^l \tag{5}$$

$$b^o = A^o x^o + n^o \tag{6}$$

Hereinafter, l represents the second sensor 20B that captures an image of the light source, and o represents the first sensor 20A that captures an image of the subject.

The information processing apparatus 10 according to the second embodiment performs spectral estimation processing on each of the first sensing information and the second sensing information detected by each of the first sensor 20A and the second sensor 20B, and then estimates the spectral reflectance of the subject.

Figure 8:
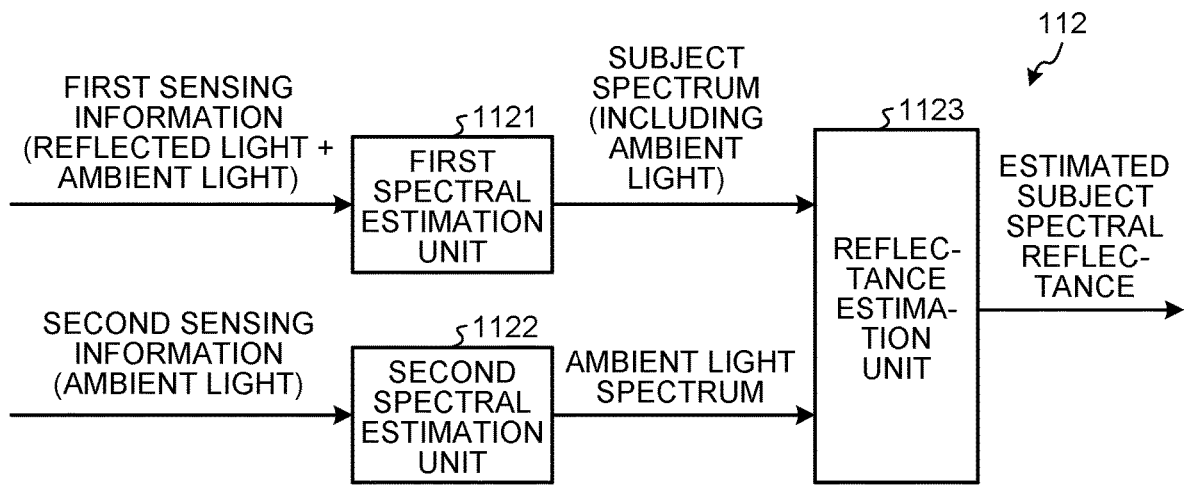
FIG. 8 is a block diagram illustrating an example of an estimation unit of an information processing apparatus according to a second embodiment of the present disclosure.

FIG. 8 is a block diagram illustrating an example of the estimation unit 112 of the information processing apparatus 10 according to the second embodiment of the present disclosure.

As illustrated in FIG. 8, the estimation unit 112 includes a first spectral estimation unit 1121, a second spectral estimation unit 1122, and a reflectance estimation unit 1123.

The first spectral estimation unit 1121 estimates a subject spectrum based on the first sensing information. For example, in a case where the Tikhonov regularization is used, the first spectral estimation unit 1121 estimates the subject spectrum from the image (first sensing information) captured by the first sensor 20A using Equation (7).

$$x^o = \mathrm{argmin}_x \{ \|A^o x - b^o\|_2^2 + \lambda F(x) \} \tag{7}$$

Here, since the first sensor 20A captures the image of the subject, the first sensing information includes information on reflected light and ambient light of the subject. Therefore, the subject spectrum estimated by the first spectral estimation unit 1121 includes the influence of the ambient light.

The second spectral estimation unit 1122 estimates an ambient light spectrum based on the second sensing information. For example, when Tikhonov regularization is used, the second spectral estimation unit 1122 estimates the ambient light spectrum from an image (second sensing information) captured by the second sensor 20B using Equation (8).

$$x^l = \mathrm{argmin}_x \{ \|A^l x - b^l\|_2^2 + \lambda F(x) \} \tag{8}$$

Here, since the second sensor 20B captures an image of the light source side, the second sensing information does not include the information on reflected light of the subject and does not include the information on ambient light. Therefore, the ambient light spectrum estimated by the second spectral estimation unit 1122 includes ambient light and does not include reflected light of the subject.

The reflectance estimation unit 1123 estimates spectral reflectance of the subject (estimated subject spectral reflectance) using the subject spectrum estimated by the first spectral estimation unit 1121 and the ambient light spectrum estimated by the second spectral estimation unit 1122.

Here, it is assumed that there is no reflection from the subject in the second sensor 20B configured to photograph the light source. It is also assumed that light (ambient light) incident on the second sensor 20B configured to photograph the light source and light hitting on the subject are emitted from the same light source. In this case, the subject spectrum $x^o$ and the ambient light spectrum $x^l$ are represented by Equations (9) to (11).

$$x^l = L^l \tag{9}$$

$$x^o = L^o R^o \tag{10}$$

$$L^l = L^o \tag{11}$$

Here, $L^l$ is the spectrum of the incident light to the second sensor 20B configured to capture an image of the light source side, $L^o$ is the spectrum of the incident light to the subject, and $R^o$ is the spectral reflectance of the subject.

The reflectance estimation unit 1123 estimates, based on the two assumptions described above, the spectral reflectance of the subject by dividing the subject spectrum by the ambient light spectrum, as shown in Equation (12).

$$R^o = x^o ./ x^l \tag{12}$$

It is noted that "./" is an operator configured to perform division for each element (pixel or wavelength).

Figure 9:
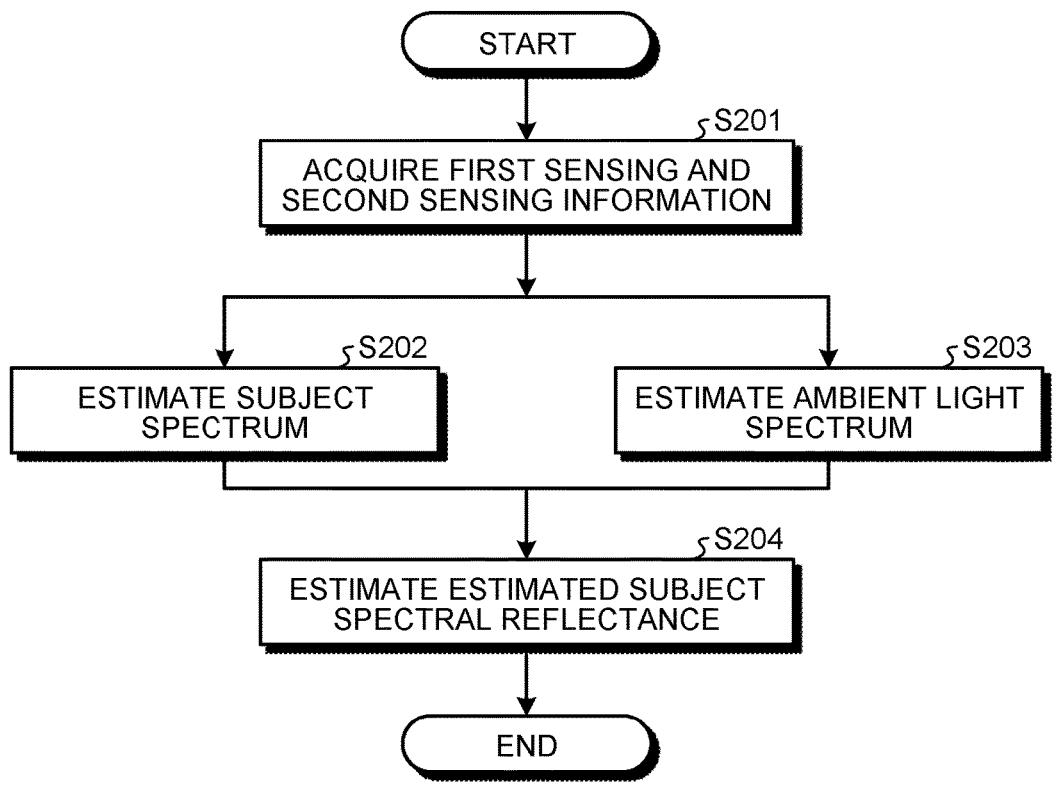
FIG. 9 is a flowchart illustrating a flow of spectral reflectance estimation processing according to the second embodiment of the present disclosure.

FIG. 9 is a flowchart illustrating a flow of the spectral reflectance estimation processing according to the second embodiment of the present disclosure. The estimation processing illustrated in FIG. 9 is executed by the information processing apparatus 10, for example, in accordance with an instruction of a user.

As illustrated in FIG. 9, the information processing apparatus 10 acquires the first sensing information obtained by allowing the first sensor 20A to capture an image of a subject and the second sensing information which is a sensing result by the second sensor 20B (Step S201). It is noted that the first sensing information and the second sensing information may be acquired at the same timing or may be acquired at different timings.

Next, the information processing apparatus 10 acquires second sensing information obtained by capturing an image of the subject by the second sensor 20B (Step S202), and estimates ambient light spectrum (Step S203). It is noted that the processing in steps S202 and S203 may be performed in parallel or sequentially. When the pieces of processing are performed in order, the order of the processing does not matter.

The information processing apparatus 10 estimates estimated subject spectral reflectance by dividing the ambient light spectrum from the subject spectrum (Step S204).

As described above, the information processing apparatus 10 according to the second embodiment estimates the subject spectrum based on the first sensing information acquired from the first sensor 20A, and the same estimates the ambient light spectrum based on the second sensing information acquired from the second sensor 20B. The information processing apparatus 10 estimates the spectral reflectance of the subject from the subject spectrum and the ambient light spectrum by division.

As a result, the information processing apparatus 10 can further reduce the influence of the ambient light included in the spectral reflectance of the subject.

4. Third Embodiment

Next, another example of the method of estimating the spectral reflectance of a subject will be described as a third embodiment. An information processing apparatus 10 according to the third embodiment estimates the spectral reflectance of the subject using first sensing information and ambient light spectrum without estimating the subject spectrum.

Figure 10:
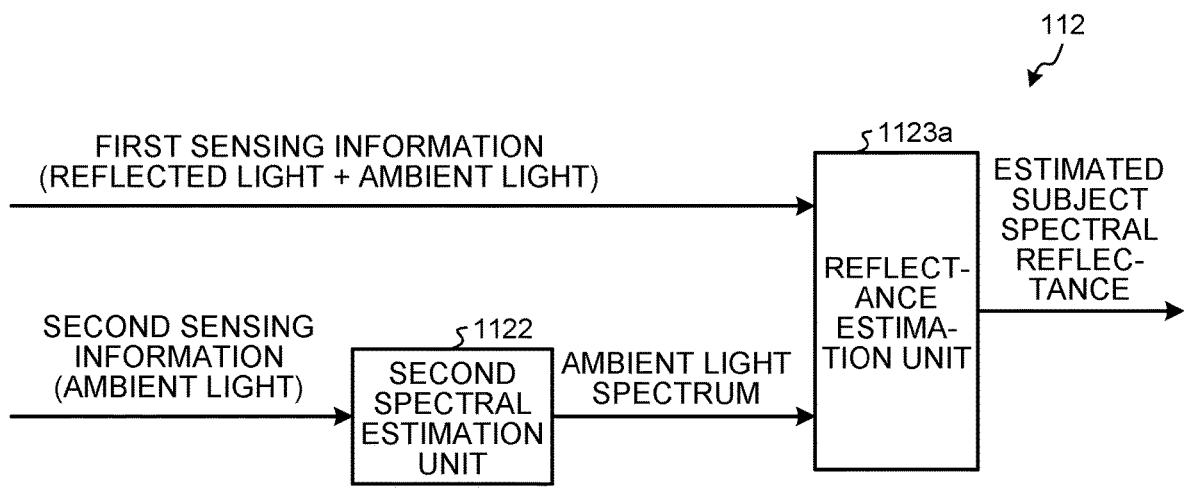
FIG. 10 is a block diagram illustrating an example of an estimation unit of an information processing apparatus according to a third embodiment of the present disclosure.

FIG. 10 is a block diagram illustrating an example of the estimation unit 112 of the information processing apparatus 10 according to the third embodiment of the present disclosure.

As illustrated in FIG. 10, an estimation unit 112 is different from the estimation unit 112 illustrated in FIG. 8 in that the first spectral estimation unit 1121 is not provided. The estimation unit 112 illustrated in FIG. 10 includes the second spectral estimation unit 1122 and a reflectance estimation unit 1123*a*.

The second spectral estimation unit 1122 estimates an ambient light spectrum based on the second sensing information. For example, when Tikhonov regularization is used, the second spectral estimation unit 1122 estimates the ambient light spectrum from an image (second sensing information) captured by the second sensor 20B using Equation (8). The ambient light spectrum estimated by the second spectral estimation unit 1122 is estimated in the same manner as in the second embodiment, as shown in Equation (8).

Next, the reflectance estimation unit 1123*a* estimates the spectral reflectance of the subject (estimated subject spectral reflectance) based on the first sensing information and the ambient light spectrum.

For example, the observation models of the first sensor 20A and the second sensor 20B are represented by Equations (13) and (14) using Equations (5), (6), and (9) to (11).

$$b^l = A^l L^l + n^l \tag{13}$$

$$b^o = A^o L^l R^o + n^o \tag{14}$$

The reflectance estimation unit 1123*a* estimates the spectral reflectance of the subject by solving $L^l$ and $R^o$ by inverse problems, respectively, using, for example, Equations (15) and (16).

$$x^l = \mathrm{argmin}_x \{ \|A^l x - b^l\|_2^2 + \lambda F(x) \} \tag{15}$$

$$R^o = \mathrm{argmin}_R \{ \|A^o L^l R - b^o\|_2^2 + \lambda' F'(R) \} \tag{16}$$

Here, F'(x) is a regularization term at the time of estimating the spectral reflectance, and F'(x) may be different from the regularization term F(x) in the case of estimating the spectrum of the light source (or the reflection term reflected by irradiating the subject by the light source).

Reference literature 1: "C. E. Mancill, "Digital Color Image Restoration", US-CIPI Rept., 630, 1975" can be cited as a reference literature related to the spectral reflectance characteristics of the subject. According to Reference Literature 1, the spectral reflectance of the subject generally has smooth characteristics in many cases. Therefore, by reflecting such characteristics in the regularization term, the reflectance estimation unit 1123*a* can further improve the estimation accuracy of the spectral reflectance of the subject.

Furthermore, the reflectance estimation unit 1123*a* may estimate the spectral reflectance of the subject by representing the spectral reflectance of the subject with regulations and obtaining a solution. By using the regulations, the solution is stabilized. Examples of a method of generating the regulations include a method using Gaussian distribution, Wavelet transformation, and principal component analysis.

Figure 11:
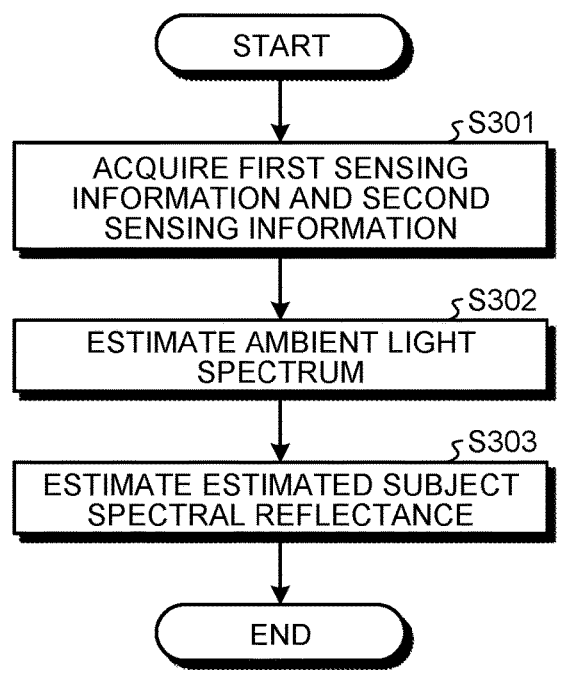
FIG. 11 is a flowchart illustrating a flow of spectral reflectance estimation processing according to the third embodiment of the present disclosure.

FIG. 11 is a flowchart illustrating a flow of the spectral reflectance estimation processing according to the third embodiment of the present disclosure. The estimation processing illustrated in FIG. 11 is executed by the information processing apparatus 10, for example, in accordance with an instruction of a user.

As illustrated in FIG. 11, the information processing apparatus 10 acquires the first sensing information obtained by allowing the first sensor 20A to capture an image of a subject and the second sensing information which is a sensing result by the second sensor 20B (Step S301). It is noted that the first sensing information and the second sensing information may be acquired at the same timing or may be acquired at different timings.

Next, the information processing apparatus 10 estimates ambient light spectrum (Step S302).

The information processing apparatus 10 estimates an estimated subject spectral reflectance by performing inverse problem analysis using the first sensing information and the ambient light spectrum (Step S303).

As described above, the information processing apparatus 10 according to the third embodiment estimates the ambient light spectrum based on the second sensing information acquired from the second sensor 20B. The information processing apparatus 10 estimates the spectral reflectance of the subject from the first sensing information acquired from the first sensor 20A and the ambient light spectrum.

As a result, the information processing apparatus 10 can further reduce the influence of the ambient light included in the spectral reflectance of the subject.

5. Fourth Embodiment

Next, another example of the method of estimating the spectral reflectance of a subject will be described as a fourth embodiment. An information processing apparatus 10 according to the fourth embodiment estimates the spectral reflectance of the subject using a lookup table (LUT).

For example, Reference Literature 2 "JP 2006-287585 A" can be cited as reference literature for estimating the spectral reflectance of the subject using the LUT. Reference Literature 2 discloses a technique of estimating a spectral reflectance from a multiband image captured by one sensor using the LUT.

In an imaging system 1 according to the present disclosure, a first sensor 20A and a second sensor 20B respectively perform sensing to acquire first sensing information and second sensing information. Therefore, the information processing apparatus 10 according to the fourth embodiment estimates the spectral reflectance of the subject using the LUT based on each piece of sensing information.

Specifically, for example, the information processing apparatus 10 uses the LUT for estimation of the subject spectrum and the ambient light spectrum. Furthermore, the information processing apparatus 10 uses the LUT for estimation of the spectral reflectance of the subject. In this case, for example, each unit of the estimation unit 112 illustrated in FIG. 8 performs each estimation using the LUT.

More specifically, the first spectral estimation unit 1121 estimates the subject spectrum using the LUT with respect to the first sensing information. The second spectral estimation unit 1122 estimates the ambient light spectrum using the LUT with respect to the second sensing information. The reflectance estimation unit 1123 combines the subject spectrum and the ambient light spectrum to estimate the spectral reflectance of the subject using the LUT.

Alternatively, the information processing apparatus 10 may use the LUT for estimation of the ambient light spectrum and estimation of the spectral reflectance of the subject. In this case, the information processing apparatus 10 uses the LUT for estimation of the ambient light spectrum and estimation of the spectral reflectance of the subject. For example, each unit of the estimation unit 112 illustrated in FIG. 10 performs each estimation using the LUT.

More specifically, the second spectral estimation unit 1122 estimates the ambient light spectrum using the LUT with respect to the second sensing information. The reflectance estimation unit 1123a combines the first sensing information and the ambient light spectrum to estimate the spectral reflectance of the subject using the LUT.

It is noted that, for example, the LUT used by each unit is calculated in advance and stored in the storage unit 120.

As described above, the information processing apparatus 10 according to the fourth embodiment uses the LUT to estimate the spectral reflectance of the subject. As a result, the information processing apparatus 10 can further reduce the influence of the ambient light included in the spectral reflectance of the subject.

6. Fifth Embodiment

Another example of the method of estimating the spectral reflectance of a subject will be described as a fifth embodiment. An information processing apparatus 10 according to the fifth embodiment estimates the spectral reflectance of the subject using machine learning. Hereinafter, a description will be given as to a case in which the information processing apparatus 10 estimates the spectral reflectance using a neural network (NN), and the information processing apparatus 10 may estimate the spectral reflectance using other machine learning.

For example, the information processing apparatus 10 according to the fifth embodiment estimates the spectral reflectance of the subject using the NN based on each piece of sensing information. For example, the information processing apparatus 10 uses the NN for estimation of the subject spectrum and the ambient light spectrum. Furthermore, the information processing apparatus 10 uses the NN for estimation of the spectral reflectance of the subject. In this case, for example, each unit of the estimation unit 112 illustrated in FIG. 8 performs each estimation using the NN.

More specifically, the first spectral estimation unit 1121 inputs the first sensing information to a learning model and obtains the subject spectrum as an output of the learning model, thereby estimating the subject spectrum. The second spectral estimation unit 1122 inputs the second sensing information to a learning model and obtains the ambient light spectrum as an output of the learning model, thereby estimating the ambient light spectrum. The reflectance estimation unit 1123 estimates the spectral reflectance of the subject by inputting the subject spectrum and the ambient light spectrum to a learning model and obtaining the spectral reflectance of the subject as an output of the learning model.

Alternatively, the information processing apparatus 10 may use the NN for estimation of the ambient light spectrum and estimation of the spectral reflectance of the subject. In this case, the information processing apparatus 10 uses the NN for estimation of the ambient light spectrum and estimation of the spectral reflectance of the subject. For example, each unit of the estimation unit 112 illustrated in FIG. 10 performs each estimation using the NN.

More specifically, the second spectral estimation unit 1122 inputs the second sensing information to a learning model and obtains the ambient light spectrum as an output of the learning model, thereby estimating the ambient light spectrum. The reflectance estimation unit 1123a inputs the first sensing information and the ambient light spectrum to a learning model and obtains the spectral reflectance of the subject as an output of the learning model, thereby estimating the spectral reflectance of the subject.

Alternatively, the information processing apparatus 10 may estimate the spectral reflectance of the subject by the NN. In this case, the estimation unit 112 illustrated in FIG. 2 estimates the spectral reflectance using the NN. More specifically, the estimation unit 112 inputs the first sensing information and the second sensing information to the learning model and obtains the spectral reflectance of the subject as an output, thereby estimating the spectral reflectance of the subject.

It is noted that the learning model used by each unit is the NN constructed in advance by machine learning using deep learning or the like, and the same is stored in, for example, the storage unit 120.

As described above, the information processing apparatus 10 according to the fifth embodiment uses the NN to estimate the spectral reflectance of the subject. As a result, the information processing apparatus 10 can further reduce the influence of the ambient light included in the spectral reflectance of the subject. Furthermore, by using the NN, the information processing apparatus 10 can estimate the spectral reflectance of the subject with higher accuracy.

7. Sixth Embodiment

Although the information processing apparatus 10 according to the embodiments described above estimates the spectral reflectance of the subject based on the sensing results of the first sensor 20A and the second sensor 20B, the present disclosure is not limited thereto. For example, an information processing apparatus 10a of an imaging system 1a may correct variations in the first sensor 20A and the second sensor 20B. Such a point will be described as a sixth embodiment.

Figure 12:
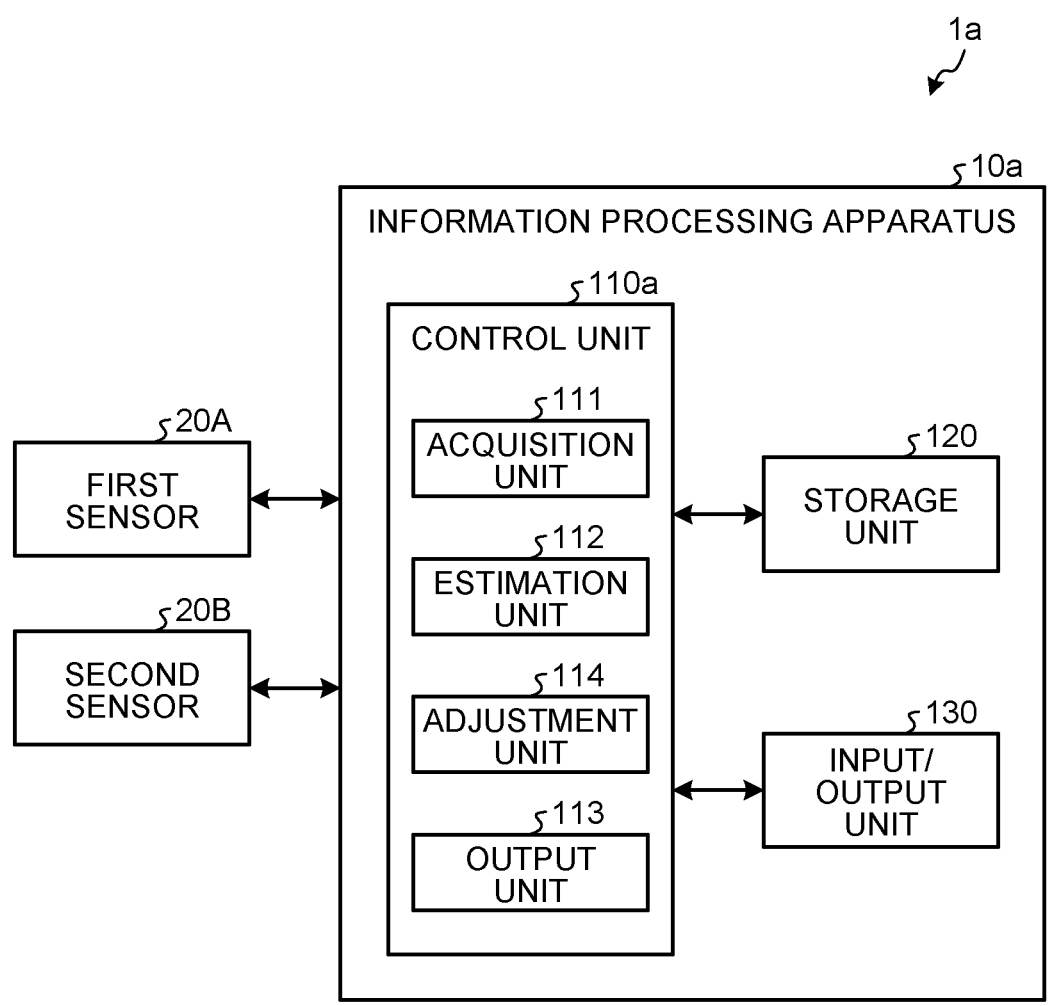
FIG. 12 is a block diagram illustrating a configuration example of an information processing apparatus according to a sixth embodiment of the present disclosure.

FIG. 12 is a block diagram illustrating a configuration example of the information processing apparatus 10a according to the sixth embodiment of the present disclosure. The information processing apparatus 10a illustrated in FIG. 12 has the same configuration and operation as those of the information processing apparatus 10 illustrated in FIG. 2 except that a control unit 110a includes an adjustment unit 114.

The adjustment unit 114 illustrated in FIG. 12 functions as a first adjustment unit configured to adjust variations in the first sensor 20A and the second sensor 20B. The adjustment unit 114 adjusts spectral sensitivity characteristics of each of the first sensor 20A and the second sensor 20B.

For example, when spectral estimation is performed using the above-described Equations (2), (7), and (8), an error of an estimation result increases if accuracy of spectral sensitivity characteristics A of each of the first sensor 20A and the second sensor 20B is low. Therefore, the adjustment unit 114 estimates spectral sensitivity of the first sensor 20A and the second sensor 20B, and adjusts the spectral sensitivity according to the estimation result. The estimation unit 112 estimates the spectral reflectance of the subject using the spectral sensitivity characteristic A adjusted by the adjustment unit 114.

It is noted that the estimation of the spectral sensitivity by the adjustment unit 114 can be performed by, for example, a method of irradiating each of the first sensor 20A and the second sensor 20B with a light source having a single wavelength, or for example, a spectral sensitivity estimation technique disclosed in Patent Literature 2.

As described above, the adjustment unit 114 corrects the spectral sensitivity characteristics A of each of the first sensor 20A and the second sensor 20B, thereby making it possible to allow each information processing apparatus 10 to further improve estimation accuracy of the spectral reflectance of the subject.

Furthermore, the adjustment unit 114 corrects variations in the light receiving surface of one sensor, and also corrects variations in the first sensor 20A and the second sensor 20B.

The adjustment unit 114 corrects the variations in the light receiving surface of one sensor, thereby making it possible to correct variations in spectral sensitivity of the first sensor 20A and variations in spectral sensitivity of the second sensor 20B. However, when the information processing apparatus 10 calculates the spectral reflectance of the subject while a difference is generated between the spectral sensitivity of the first sensor 20A and the spectral sensitivity of the second sensor 20B, an error may be included in the spectral reflectance.

As described above, there may be a difference between the spectral sensitivity of the first sensor 20A and the spectral sensitivity of the second sensor 20B. That is, even if the first sensor 20A and the second sensor 20B photograph the same subject, the results of spectral estimation by the estimation unit 112 may be different from each other.

Therefore, the adjustment unit 114 functions as a second adjustment unit configured to adjust the processing in the estimation unit 112 so that the difference between the spectral sensitivity of the first sensor 20A and the spectral sensitivity of the second sensor 20B becomes small. That is, even if the first sensor 20A and the second sensor 20B photograph the same subject, the processing in the estimation unit 112 is adjusted so that the results of spectral estimation by the estimation unit 112 become the same.

As an adjustment method by the adjustment unit 114, there is a method of aligning the system responses.

Here, the definition of a reconstruction coefficient M and a system response in Equation (2) will be described using Equation (17). Here, as an example, a case where the regularization term F(x) is Equation (3) will be described, but the regularization term is not limited to the example of Equation (3).

$$\hat{x} = \mathrm{argmin}_x \{\|Ax - b\|_2^2 + \lambda \|Lx\|_2^2\} \quad (17)$$
$$= (A^T A + \lambda F^T F)^{-1} A^T b$$
$$= Mb$$

Here, M is represented by Equation (18).

$$M = (A^T A + \lambda F^T F)^{-1} A^T \quad (18)$$

In addition, a system response S is defined as shown in Equation (19).

$$S = MA \quad (19)$$

The system response S becomes a matrix representing what kind of spectrum is output by allowing the estimation unit 112 to perform signal processing on a spectrum entering a sensor (sensing result by a sensor). That is, by performing signal processing so that the system response S matches between the first sensor 20A and the second sensor 20B, the adjustment unit 114 further reduces deviation in spectral sensitivity between the first sensor 20A and the second sensor 20B. That is, when the same subject is imaged, a result of performing the signal processing on the first sensing information output from the first sensor 20A and a result of performing the signal processing on the second sensing information output from the second sensor 20B match each other.

In order to achieve this, the adjustment unit 114 obtains a reconstruction coefficient so as to minimize a difference from a system response $S_t$ when a typical sensor is used in consideration of variations in the first sensor 20A and the second sensor 20B. In other words, the adjustment unit 114 obtains the reconstruction coefficient so as to minimize a difference between a system response when the first sensor 20A is used and a system response when the second sensor 20B is used.

That is, the adjustment unit 114 sets the reconstruction coefficient so that Equation (20) becomes small. As a result, the deviation in spectral sensitivity between the first sensor 20A and the second sensor 20B can be further reduced.

$$(MA-S_t)^T(MA-S_t) \quad (20)$$

In this manner, the adjustment unit 114 sets the reconstruction coefficient, thereby making it possible not only to further reduce deviation in spectral sensitivity between the first sensor 20A and the second sensor 20B, but also to further improve estimation accuracy of the spectral reflectance of the subject.

It is noted that the adjustment method by the adjustment unit 114 is not limited to the method of aligning the system responses described above. For example, the adjustment unit 114 may adjust the difference between the spectral sensitivity of the first sensor 20A and the spectral sensitivity of the second sensor 20B using the result of actually imaging the same subject.

For example, the method of aligning the system responses described above is signal processing based on the spectral sensitivity characteristics of each of the first sensor 20A and the second sensor 20B. On the other hand, in an actual use case, when the spectrum of the subject is determined to some extent, the adjustment unit 114 can adjust the signal processing in the estimation unit 112 by photographing the spectrum close to the subject. For example, this method can be applied when a light source to be used is determined, or when a subject is determined to some extent, such as a human being.

In this case, the adjustment unit 114 captures an image of the same subject with each of the first sensor 20A and the second sensor 20B, and corrects the processing in the estimation unit 112 so that the results of estimating imaging results by the estimation unit 112 match each other. This method is based on an idea similar to a method performed by photographing a Macbeth chart as adjustment of signal processing of performing color correction in a camera that reconstructs an RGB image.

For example, the adjustment unit 114 sets the reconstruction coefficient such that the spectrum estimated by capturing an image of the same subject using another sensor (for example, the second sensor 20B) becomes closer to the spectrum estimated by capturing an image of the subject using a typical sensor (for example, first sensor 20A). That is, the adjustment unit 114 sets the reconstruction coefficient so that Equation (21) becomes smaller.

$$(Mb-\tilde{x}_t)^T(Mb-\tilde{x}_t) \quad (2)$$

In this manner, the adjustment unit 114 sets the reconstruction coefficient using the actual imaging result, thereby making it possible not only to further reduce the deviation in spectral sensitivity between the first sensor 20A and the second sensor 20B, but also to further improve the estimation accuracy of the spectral reflectance of the subject.

It is noted that the setting of the reconstruction coefficient by the adjustment unit 114 is performed, for example, at the time of constructing the imaging system 1. Alternatively, the setting of the reconstruction coefficient may be performed before spectral reflectance estimation processing of the subject is performed.

8. Hardware Configuration

Figure 13:
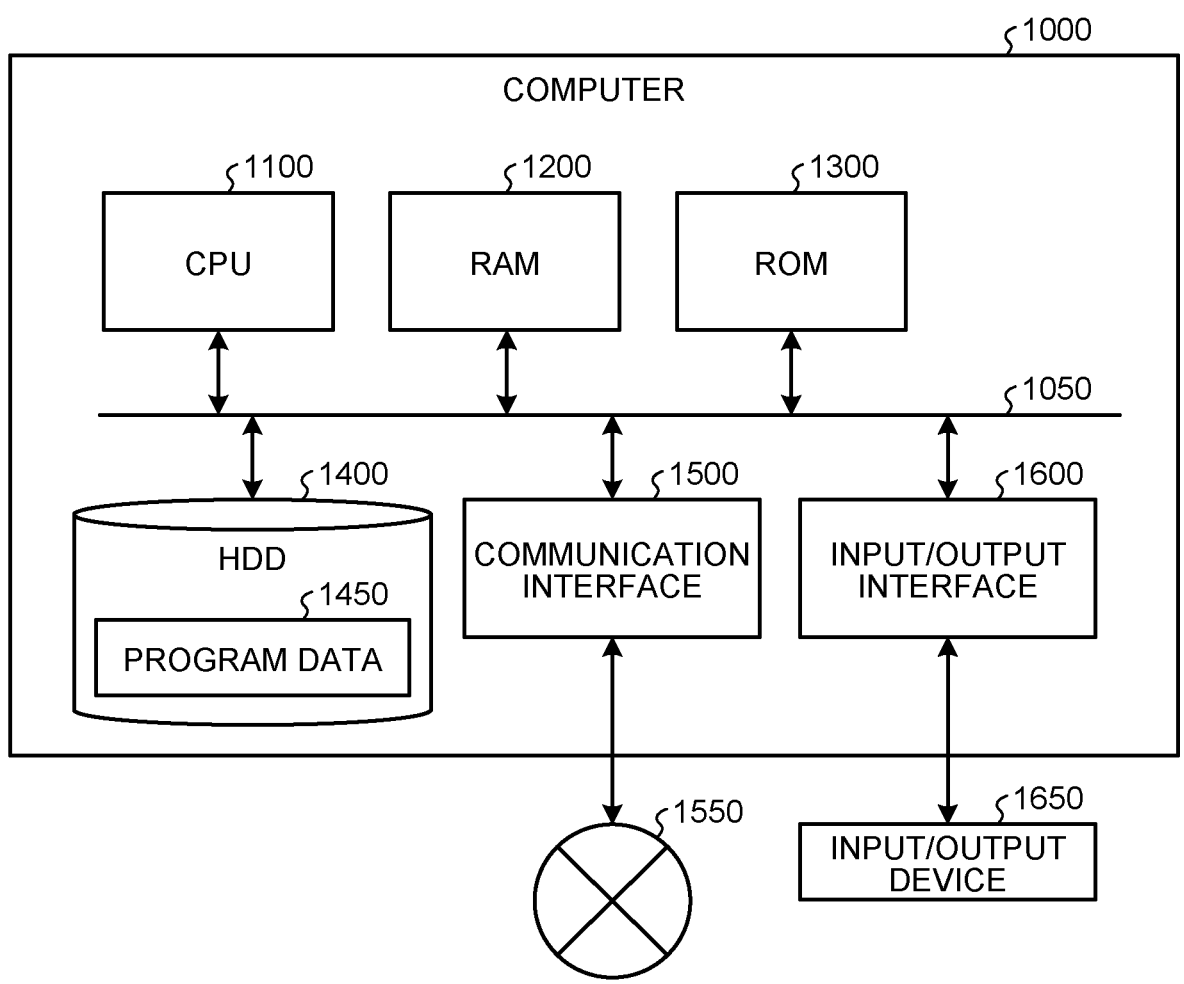
FIG. 13 is a hardware configuration diagram illustrating an example of a computer configured to implement a function of an information processing apparatus.

The information processing apparatus 10 according to the embodiment described above is implemented by, for example, a computer 1000 configured as illustrated in FIG. 13. FIG. 13 is a hardware configuration diagram illustrating an example of the computer 1000 configured to implement the functions of the information processing apparatus 10. The computer 1000 includes a CPU 1100, a RAM 1200, a ROM 1300, a storage 1400, a communication interface 1500, and an input/output interface 1600. Each unit of the computer 1000 is connected by a bus 1050.

The CPU 1100 operates based on a program stored in the ROM 1300 or the storage 1400, and controls each unit. For example, the CPU 1100 loads the program stored in the ROM 1300 or the storage 1400 into the RAM 1200 and executes processing corresponding to various programs.

The ROM 1300 stores a boot program such as a basic input output system (BIOS) executed by the CPU 1100 when the computer 1000 is started, a program dependent on the hardware of the computer 1000, and the like.

The storage 1400 is a computer-readable recording medium that non-transiently records a program executed by the CPU 1100, data used by the program, and the like. Specifically, the storage 1400 is a recording medium that records a program according to the present disclosure which is an example of program data 1450.

The communication interface 1500 is an interface configured to connect the computer 1000 to an external network 1550. For example, the CPU 1100 receives data from another device or transmits data generated by the CPU 1100 to another device via the communication interface 1500.

The input/output interface 1600 is an interface configured to connect an input/output device 1650 to the computer 1000. For example, the CPU 1100 can receive data from an input device such as a keyboard, a mouse, or an acceleration sensor 13 via the input/output interface 1600. Furthermore, the CPU 1100 can transmit data to an output device such as a display, a speaker, or a printer via the input/output interface 1600. Furthermore, the input/output interface 1600 may function as a media interface configured to read a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing apparatus 10 according to the embodiment, the CPU 1100 of the computer 1000 implements the function of the control unit 110 by executing the information processing program loaded on the RAM 1200. In addition, the storage 1400 stores the program according to the present disclosure and the data in the storage unit 120. It is noted that the CPU 1100 reads the program data 1450 from the storage 1400 and executes the same, and, as another example, the CPU 1100 may acquire these programs from other apparatuses via the external network 1550.

9. Summary

Although the preferred embodiments of the present disclosure have been described in detail with reference to the accompanying drawings, the technical scope of the present disclosure is not limited to such examples. It is obvious that a person having ordinary knowledge in the technical field of the present disclosure can conceive various changes or modifications within the scope of the technical idea described in the claims, and it is naturally understood that these also belong to the technical scope of the present disclosure.

Among the pieces of processing described in the above embodiments, all or a part of the processing described as being performed automatically can be manually performed, or all or a part of the processing described as being performed manually can be automatically performed by a known method. In addition, the processing procedure, specific name, and information including various data and parameters illustrated in the document and the drawings can be arbitrarily changed unless otherwise specified. For example, the various types of information illustrated in each drawing are not limited to the illustrated information.

In addition, each component of each apparatus illustrated in the drawings is functionally conceptual, and is not necessarily physically configured as illustrated in the drawings. That is, a specific form of distribution and integration of each apparatus is not limited to the illustrated form, and all or a part thereof can be functionally or physically distributed and integrated in any unit depending on various loads, usage conditions, and the like.

In addition, the above-described embodiments can be appropriately combined within a range in which the processing contents do not contradict each other.

Furthermore, the effects described in the present specification are merely illustrative or exemplary, and are not restrictive. That is, the technique according to the present disclosure can exhibit other effects obvious to those skilled in the art from the description of the present specification together with or instead of the above-described effects.

It is noted that the following configurations also belong to the technical scope of the present disclosure.

(1)
An information processing apparatus comprising:
a first acquisition unit configured to acquire first sensing information obtained by capturing an image of a subject using a first sensor including a single-plate image sensor;
a second acquisition unit configured to acquire second sensing information obtained by sensing a direction different from a direction of the first sensor using a second sensor; and
an estimation unit configured to estimate spectral reflectance of the subject based on the first sensing information and the second sensing information.

(2)
The information processing apparatus according to (1), wherein the second sensor is a sensor configured to sense information on ambient light.

(3)
The information processing apparatus according to (1) or (2),
wherein the first sensor is disposed toward the subject,
wherein the second sensor is disposed toward a light source side.

(4)
The information processing apparatus according to any one of (1) to (3), wherein the second sensor is a sensor configured to receive light having substantially the same bandwidth as a bandwidth of the first sensor.

(5)
The information processing apparatus according to any one of (1) to (4), wherein the second sensor includes a single-plate image sensor.

(6)
The information processing apparatus according to any one of (1) to (4), wherein the second sensor is a sensor configured to detect color temperature.

(7)
The information processing apparatus according to any one of (1) to (6), wherein the estimation unit includes:
a first spectral estimation unit configured to estimate a subject spectrum from the first sensing information;
a second spectral estimation unit configured to estimate an ambient light spectrum from the second sensing information; and
a reflectance estimation unit configured to estimate the spectral reflectance of the subject based on the subject spectrum and the ambient light spectrum.

(8)
The information processing apparatus according to any one of (1) to (6), wherein the estimation unit includes:
a spectral estimation unit configured to estimate an ambient light spectrum from the second sensing information; and
a reflectance estimation unit configured to estimate the spectral reflectance of the subject based on the first sensing information and the ambient light spectrum.

(9)
The information processing apparatus according to any one of (1) to (8), wherein the estimation unit estimates the spectral reflectance of the subject using a lookup table.

(10)
The information processing apparatus according to any one of (1) to (8), wherein the estimation unit estimates the spectral reflectance of the subject based on a learning model generated by machine learning.

(11)
The information processing apparatus according to any one of (1) to (10), further comprising a first adjustment unit configured to adjust spectral sensitivity of a sensing area of each of the first sensor and the second sensor.

(12)
The information processing apparatus according to any one of (1) to (11), further comprising a second adjustment unit configured to adjust a variation in sensing between the first sensor and the second sensor.

(13)
The information processing apparatus according to (12), wherein the second adjustment unit adjusts the processing such that a system response of processing for the first sensing information by the estimation unit and a system response of processing for the second sensing information match each other.

(14)

The information processing apparatus according to (12), wherein the second adjustment unit adjusts, using each of the first sensing information and the second sensing information obtained by sensing the same subject by the first sensor and the second sensor, processing so that results of the processing performed by the estimation unit match each other.

(15)

An imaging system comprising:
a first sensor including a single-plate image sensor;
a second sensor configured to sense a direction different from a direction of the first sensor; and
an information processing apparatus,
wherein the imaging system comprises:
a first acquisition unit configured to acquire first sensing information obtained by capturing an image of a subject using the first sensor;
a second acquisition unit configured to acquire second sensing information sensed by the second sensor; and
an estimation unit configured to estimate spectral reflectance of the subject based on the first sensing information and the second sensing information.

(16)

An information processing method comprising:
acquiring first sensing information obtained by capturing an image of a subject using a first sensor including a single-plate image sensor;
acquiring second sensing information obtained by sensing a direction different from a direction of the first sensor using a second sensor; and
estimating spectral reflectance of the subject based on the first sensing information and the second sensing information.

(17)

A program configured to cause a computer to execute:
acquiring first sensing information obtained by capturing an image of a subject using a first sensor including a single-plate image sensor;
acquiring second sensing information obtained by sensing a direction different from a direction of the first sensor using a second sensor; and
estimating spectral reflectance of the subject based on the first sensing information and the second sensing information.

REFERENCE SIGNS LIST

1 IMAGING SYSTEM
10 INFORMATION PROCESSING APPARATUS
20 SENSOR
110 CONTROL UNIT
111 ACQUISITION UNIT
112 ESTIMATION UNIT
113 OUTPUT UNIT
120 STORAGE UNIT
130 INPUT/OUTPUT UNIT
210 IMAGE SENSOR
220 LENS
230 DIFFUSER CLAIMS

The invention claimed is:

1. An information processing apparatus, comprising
at least one processor configured to:
acquire first sensing information, wherein
the first sensing information is obtained based on a capture of an image of a subject by a first sensor, and
the first sensor includes a first single-plate image sensor;
acquire second sensing information,
wherein the second sensing information is obtained, by a first sensing operation of a first direction different from a second direction of the first sensor, by a second sensor;
adjust spectral sensitivity of a sensing area of each of the first sensor and the second sensor; and
estimate spectral reflectance of the subject based on the first sensing information and the second sensing information.

2. The information processing apparatus according to claim 1, wherein the second sensor senses information on ambient light.

3. The information processing apparatus according to claim 1, wherein
the first sensor is toward the subject, and
the second sensor is toward a light source side.

4. The information processing apparatus according to claim 1, wherein the second sensor receives light having a bandwidth same as a bandwidth of the first sensor.

5. The information processing apparatus according to claim 1, wherein the second sensor includes a second single-plate image sensor.

6. The information processing apparatus according to claim 1, wherein the second sensor detects color temperature.

7. The information processing apparatus according to claim 1, wherein the at least one processor is further configured to:
estimate a subject spectrum from the first sensing information;
estimate an ambient light spectrum from the second sensing information; and
estimate the spectral reflectance of the subject based on the subject spectrum and the ambient light spectrum.

8. The information processing apparatus according to claim 1, wherein the at least one processor is further configured to includes:
estimate an ambient light spectrum from the second sensing information; and
estimate the spectral reflectance of the subject based on the first sensing information and the ambient light spectrum.

9. The information processing apparatus according to claim 1, wherein the at least one processor is further configured to estimate, based on a lookup table, the spectral reflectance of the subject.

10. The information processing apparatus according to claim 1, wherein the at least one processor is further configured to estimate the spectral reflectance of the subject based on a learning model generated by machine learning.

11. The information processing apparatus according to claim 1, wherein the at least one processor is further configured to adjust a variation in a second sensing operation between the first sensor and the second sensor.

12. The information processing apparatus according to claim 11, wherein the at least one processor is further configured to adjust a process such that a first system response of a processing operation for the first sensing information and a second system response of a processing operation for the second sensing information match each other.

13. The information processing apparatus according to claim 12, wherein the at least one processor is further configured to adjust, based on each of the first sensing information and the second sensing information obtained by a third sensing operation of the subject by the first sensor and the second sensor, a processing operation so that a first result of the processing operation on the first sensing information matches second result of the processing operation on the second sensing a information.

14. An imaging system, comprising:
   a first sensor including a single-plate image sensor;
   a second sensor configured to sense a first direction different from a second direction of the first sensor; and
   an information processing apparatus, wherein the imaging system comprises at least one processor configured to:
      acquire first sensing information,
         wherein the first sensing information is obtained based on a capture of an image of a subject by the first sensor;
      acquire second sensing information sensed by the second sensor;
      adjust spectral sensitivity of a sensing area of each of the first sensor and the second sensor; and
      estimate spectral reflectance of the subject based on the first sensing information and the second sensing information.

15. An information processing method, comprising:
   by at least one processor:
      acquiring first sensing information obtained by capturing an image of a subject using a first sensor,
         wherein the first sensor includes a single-plate image sensor;
      acquiring second sensing information obtained, by sensing a first direction different from a second direction of the first sensor, using a second sensor;
      adjusting spectral sensitivity of a sensing area of each of the first sensor and the second sensor; and
      estimating spectral reflectance of the subject based on the first sensing information and the second sensing information.

16. A non-transitory computer-readable medium having stored thereon computer-executable instructions that, when executed by a processor, cause the processor to execute operations, the operations comprising:
   acquiring first sensing information obtained by capturing an image of a subject using a first sensor,
      wherein the first sensor includes a single-plate image sensor;
   acquiring second sensing information obtained, by sensing a first direction different from a second direction of the first sensor using a second sensor;
   adjusting spectral sensitivity of a sensing area of each of the first sensor and the second sensor; and
   estimating spectral reflectance of the subject based on the first sensing information and the second sensing information.

* * * * *